US011550931B1

(12) United States Patent
Dintchev et al.

(10) Patent No.: US 11,550,931 B1
(45) Date of Patent: Jan. 10, 2023

(54) DATA CERTIFICATION SYSTEM AND PROCESS FOR CENTRALIZED USER FILE ENCAPSULATION, ENCRYPTION, NOTARIZATION, AND VERIFICATION USING A BLOCKCHAIN

(71) Applicants: Dimitre Ognianov Dintchev, Reno, NV (US); Stuart L Corrans, Reno, NV (US); Matt Turrino, Reno, NV (US)

(72) Inventors: Dimitre Ognianov Dintchev, Reno, NV (US); Stuart L Corrans, Reno, NV (US); Matt Turrino, Reno, NV (US)

(73) Assignee: Galena Hills Inc., Reno, NV (US)

( * ) Notice: Subject to any disclaimer, the term of this patent is extended or adjusted under 35 U.S.C. 154(b) by 67 days.

(21) Appl. No.: 16/926,147

(22) Filed: Jul. 10, 2020

Related U.S. Application Data

(60) Provisional application No. 62/873,069, filed on Jul. 11, 2019.

(51) Int. Cl.
| | |
|---|---|
| *H04L 9/40* | (2022.01) |
| *G06F 21/60* | (2013.01) |
| *H04L 9/32* | (2006.01) |
| *G06F 21/62* | (2013.01) |
| *H04L 9/06* | (2006.01) |
| *H04L 9/00* | (2022.01) |

(52) U.S. Cl.
CPC ........ *G06F 21/602* (2013.01); *G06F 21/6218* (2013.01); *H04L 9/0637* (2013.01); *H04L 9/0643* (2013.01); *H04L 9/3247* (2013.01); *H04L 9/50* (2022.05)

(58) Field of Classification Search
CPC . G06F 21/602; G06F 21/6218; H04L 9/0637; H04L 9/0643; H04L 9/3247; H04L 2209/38
See application file for complete search history.

(56) References Cited

U.S. PATENT DOCUMENTS

| | | | |
|---|---|---|---|
| 5,852,665 A * | 12/1998 | Gressel | H04L 9/0894 380/45 |
| 7,689,832 B2 * | 3/2010 | Talmor | H04L 9/3249 713/186 |
| 7,853,621 B2 * | 12/2010 | Guo | G06F 16/58 707/999.1 |
| 9,747,459 B2 * | 8/2017 | Faitelson | G06F 21/604 |
| 10,871,955 B2 * | 12/2020 | Lewis | G06F 8/65 |
| 2003/0191716 A1 * | 10/2003 | Woods | G06F 21/6218 705/50 |

(Continued)

*Primary Examiner* — Ghodrat Jamshidi
(74) *Attorney, Agent, or Firm* — Plager Schack LLP; Mark H. Plager; Stephen Hallberg

(57) ABSTRACT

A process for centralized user file encapsulation, encryption, notarization and verification using a blockchain and a system that certifies data in a proprietary "capsule" file format, with tamper-proof blockchain are disclosed. By utilizing a hybridization of both cloud and blockchain storage mechanisms, the present invention allows for the performant and cost-effective certification of large amounts of data. Furthermore, the generation of the capsule allows for users to store both the data payload and its digital notarization. The system then allows for users to share the capsule with others (by way of permissions enforced by the notary system) and upload it for verification of authenticity at a later point in time.

10 Claims, 9 Drawing Sheets

(56) References Cited

U.S. PATENT DOCUMENTS

| | | | | |
|---|---|---|---|---|
| 2006/0184931 | A1* | 8/2006 | Rochette | G06F 8/61 717/136 |
| 2010/0293147 | A1* | 11/2010 | Snow | G06F 16/10 707/E17.007 |
| 2014/0249847 | A1* | 9/2014 | Soon-Shiong | G16H 40/67 705/2 |
| 2014/0281504 | A1* | 9/2014 | Dasari | H04L 9/3268 713/158 |
| 2015/0049163 | A1* | 2/2015 | Smurro | H04L 65/403 348/14.08 |
| 2015/0189041 | A1* | 7/2015 | Wang | H04L 67/306 709/204 |
| 2016/0148013 | A1* | 5/2016 | Taldo | G06F 21/6218 713/165 |
| 2016/0224765 | A1* | 8/2016 | Shimazu | G06F 21/62 |
| 2017/0206370 | A1* | 7/2017 | Bahrs | G06F 21/602 |
| 2018/0191503 | A1* | 7/2018 | Alwar | H04L 9/14 |
| 2019/0243634 | A1* | 8/2019 | Lewis | G06F 8/654 |
| 2020/0259810 | A1* | 8/2020 | Hill | H04L 67/10 |

\* cited by examiner

FIG. 7

```
<?XML VERSION="1.0" ENCODING=UTF-8"?>
<XSD:SCHEMA XMLNS:XSI="HTTP://WWW.W3.ORG/2001/XMLSCHEMA-INSTANCE"
    XMLNS:XSD="HTTP://WWW.W3.ORG/2001/XMLSCHEMA"
    ATTRIBUTEFORMDEFAULT="UNQUALIFIED" ELEMENTFORMDEFAULT="QUALIFIED"
    TARGETNAMESPACE="HTTP://WWW.GALENAHILL.COM/SCHEMA/GHSCAPSULE/V1">
 <XSD:ELEMENT NAME="SERIALIZABLENOTARIZEDCAPSULEV1">
  <XSD:COMPLEXTYPE>
   <XSD:SEQUENCE>
    <XSD:ELEMENT NAME="CONTENT" MINOCCURS="1" MAXOCCURS="1">
     <XSD:COMPLEXTYPE>
      <XSD:SEQUENCE>
       <XSD:ELEMENT NAME="FILES" MINOCCURS="1" MAXOCCURS="1">
        <XSD:COMPLEXTYPE>
         <XSD:SEQUENCE>
          <XSD:ELEMENT NAME="SERIALIZABLECAPSULEFILEITEMV1" MINOCCURS="1" MAXOCCURS="1000">
           <XSD:COMPLEXTYPE>
            <XSD:SEQUENCE>
             <XSD:ELEMENT NAME="ID" MINOCCURS="1" MAXOCCURS="1" TYPE="XSD:STRING" />
             <XSD:ELEMENT NAME="FILENAME" MINOCCURS="1" MAXOCCURS="1" TYPE="XSD:STRING" />
             <XSD:ELEMENT NAME="FILESIZE" MINOCCURS="1" MAXOCCURS="1" TYPE="XSD:UNSIGNEDLONG" />
             <XSD:ELEMENT NAME="FILETYPE" MINOCCURS="1" MAXOCCURS="1" TYPE="XSD:STRING" />
             <XSD:ELEMENT NAME="CRC32" TYPE="XSD:UNSIGNEDINT" />
             <XSD:ELEMENT NAME="FILECONTENT" TYPE="XSD:BASE64BINARY" />
            </XSD:SEQUENCE>
           </XSD:COMPLEXTYPE>
          </XSD:ELEMENT>
         </XSD:SEQUENCE>
        </XSD:COMPLEXTYPE>
       </XSD:ELEMENT>
      </XSD:SEQUENCE>
     </XSD:COMPLEXTYPE>
    </XSD:ELEMENT>
```

C TO FIG.8

C FROM FIG.7

```
<XSD:ELEMENT NAME="ENTITYTYPE" MINOCCURS="1" MAXOCCURS="1" TYPE="XSD:STRING" />
<XSD:ELEMENT NAME="ENTITYID" MINOCCURS="1" MAXOCCURS="1" TYPE="XSD:STRING" />
<XSD:ELEMENT NAME="FILEFORMATVERSION" MINOCCURS="1" MAXOCCURS="1" TYPE="XSD:DECIMAL" />
<XSD:ELEMENT NAME="NAME" MINOCCURS="1" MAXOCCURS="1" TYPE="XSD:STRING" />
<XSD:ELEMENT NAME="DESCRIPTION" MINOCCURS="1" MAXOCCURS="1" TYPE="XSD:STRING" />
<XSD:ELEMENT NAME="CAPSULEID" MINOCCURS="1" MAXOCCURS="1" TYPE="XSD:STRING" />
<XSD:ELEMENT NAME="CREATEDDATEUTC" MINOCCURS="1" MAXOCCURS="1" TYPE="XSD:DATETIME" />
<XSD:ELEMENT NAME="OWNERIDENTITY" MINOCCURS="1" MAXOCCURS="1" TYPE="XSD:STRING" />
<XSD:ELEMENT NAME="NOTARYIDENTITY" TYPE="XSD:STRING" />
<XSD:ELEMENT NAME="NOTARYSIGNALGORITHM" TYPE="XSD:STRING" />
<XSD:ELEMENT NAME="NOTARYSIGNDATEUTC" MINOCCURS="1" MAXOCCURS="1" TYPE="XSD:DATETIME" />
<XSD:ELEMENT NAME="LEDGERSELECTION" MINOCCURS="1" MAXOCCURS="1" TYPE="XSD:STRING" />
<XSD:ELEMENT NAME="BLOCKORCONTRACTID" MINOCCURS="1" MAXOCCURS="1" TYPE="XSD:UNSIGNEDBYTE" />
<XSD:ELEMENT NAME="TRANSACTIONHASH" MINOCCURS="1" MAXOCCURS="1" TYPE="XSD:STRING" />
<XSD:ELEMENT NAME="SCRIBEWRITEDATEUTC" MINOCCURS="1" MAXOCCURS="1" TYPE="XSD:DATETIME" />
<XSD:ELEMENT NAME="NOTARYSIGNATURE" MINOCCURS="1" MAXOCCURS="1" TYPE="XSD:STRING" />
    </XSD:SEQUENCE>
  </XSD:COMPLEXTYPE>
 </XSD:ELEMENT>
</XSD:SCHEMA>
```

FIG.8

DATA CERTIFICATION SYSTEM AND PROCESS FOR CENTRALIZED USER FILE ENCAPSULATION, ENCRYPTION, NOTARIZATION, AND VERIFICATION USING A BLOCKCHAIN

CLAIM OF BENEFIT TO PRIOR APPLICATION

This application claims benefit to U.S. Provisional Patent Application 62/873,069, entitled "A software system that certifies data in a proprietary file format, "Capsule", with tamper-proof blockchain," filed Jul. 11, 2019. The U.S. Provisional Patent Application 62/873,069 is incorporated herein by reference.

BACKGROUND

Embodiments of the invention described in this specification relate generally to encryption of computer files, and more particularly, to verification of the authenticity of encrypted computer files through a centralized server computer system, which has previously digitally signed these same files, and persisted this digital signature in a blockchain.

Traditional centralized databases and cloud storage systems do allow for the storage of large amounts of data and files. However, such systems also leave such data vulnerable to tampering.

Immutable data storage systems that strive to rectify this vulnerability with blockchain technology tend to exhibit poor performance in regard to latency, throughput, and cost, specifically related to storage of large amounts of data. This is primarily due to the inherent nature of the current state of the art consensus algorithms present in distributed transaction/data storage systems (i.e., blockchains).

Encryption has also been used to solve the problem. Encryption of user generated files with secure digital cryptography is commonly applied or performed among conventional encryption-capable systems which typically require that the file owner retain an encryption secret, such as the key (in symmetric cryptography) or a public/private key pair (in asymmetric cryptography). Such encrypted files may be later decrypted by presenting the same secret key (if symmetric cryptography was used during the file encryption) or the complementary key (i.e., private/public, if asymmetric cryptography was used). After encrypting the files, the original file owner can share such encrypted files with other recipient parties or other users ("recipients") through mediums such as file sharing, email attachments, and removable media, among others. Assuming contemporary best-practices in encryption have been utilized, such recipients must also possess knowledge of the applicable encryption secret in order to decrypt such files.

However, the conventional encryption-capable systems have limitations that are problematic. For instance, the recipient of encrypted file content cannot reasonably prove or verify the time stamp at which the files were encrypted by the Owner using conventional encryption-capable systems. Furthermore, if the secret encryption key used to encrypt these files is ever compromised, the content can be maliciously altered, and the file can be re-encrypted, without the recipient of the encrypted file being aware of the alteration to the encrypted file content.

In addition, many of the existing file and folder archiving formats may be vulnerable to security exploits. Specifically, the existing file and folder archiving formats which combine both compression and encryption to encapsulate and encrypt multiple files (i.e., compressing files, bundling the compressed files, and then encrypting the compressed files encapsulated in the archive file) are vulnerable to security exploits, such as when an attacker may reasonably guess at least part of the content of the files.

Therefore, what is needed is a way to certify the contents of a file which encapsulates one or more files in a particular verifiable format that allows for user access rights setting and sharing.

BRIEF DESCRIPTION

Some embodiments of the invention include a novel blockchain-based data certification system that encapsulates, encrypts, notarizes, and verifies user file data using a blockchain and a novel blockchain-based data certification process for centralized user file encapsulation, encryption, notarization, and verification using a blockchain.

In some embodiments, the blockchain-based data certification system that encapsulates, encrypts, notarizes, and verifies user file data using a blockchain includes a capsule file generation system, a central notary system, a central user access control database, and a blockchain.

In some embodiments, the blockchain-based data certification process provides a capsule file generation process for centralized user file encapsulation, encryption, notarization, and verification using a blockchain. In some embodiments, the capsule file generation process includes a plurality of steps comprising (i) selecting and uploading one or more files, by an owner user, to a centralized and trusted notary system ("centralized notary system"), (ii) authenticating identity of the owner user by the centralized notary system, (iii) applying a contemporary, NIST-approved cryptographic digital signature to the one or more files, (iv) storing the cryptographic digital signature onto a blockchain record, (v) storing, onto the same blockchain record, a timestamp of an accurate time at which the cryptographic digital signature is stored onto the blockchain record, and (vi) generating a capsule file as a single file that includes the cryptographic digital signature, the timestamp, a storage location identifier reported by the blockchain that identifies a storage location of the blockchain record, and either an encrypted representation of the one or more files uploaded by the owner user or the entire encrypted content of the one or more files uploaded by the user.

In some embodiments, the capsule file is made available to the owner user after the capsule file generation process generates the capsule file for the blockchain-based data certification process. In this way, the owner user can store the capsule file on or transfer the capsule file to a storage medium of the owner user's choosing. For example, the owner user can download the capsule file to a private storage device of the owner user or transfer the capsule file to a cloud storage unit or cloud database of the owner user's choosing.

In some embodiments, the owner user of the capsule file can selectively share the capsule file with other users as authorized by the owner user. In some embodiments, the owner user informs the central notary system of the identity of each other user with whom the owner user intends to share the capsule file. For each other user, the owner user presents the central notary system of some embodiments with an email address as the identity. In some embodiments, the central notary system confirms the identities and sets the other users as authorized parties to share the capsule file. In some embodiments, the blockchain-based data certification process provides a capsule file access granting process for the owner user to share access to the capsule file with one or more target users.

In some embodiments, the owner user and each authorized party is able to present the capsule file to the central notary system for certification. For instance, after the capsule file is generated, the owner user may selectively share the capsule file with other users (who are then identified by the central notary system as authorized parties), and each user (i.e., the owner user and each of the authorized party users, all of which are also individually referred to as a "presenting user" or collectively as "presenting users") may present the capsule file to the central notary system to determine whether the contents of the capsule file presented are authentic, and specifically, to certify that the contents of presented capsule file have not been tampered with. In some embodiments, the central notary system certifies the capsule file by recomputing the cryptographic digital signature of the contents of the presented capsule file, and by confirming that the date asserted, and the cryptographic digital signature computed based on the contents of the capsule file are in agreement with the cryptographic digital signature and timestamp stored in the blockchain record at the storage location on the blockchain, which has been indicated within the information stored in the presented capsule file. Collectively, these steps are referred to as capsule file verification (or simply, "verification"). In some embodiments, the blockchain-based data certification process provides a capsule file verification process to perform the steps to verify and certify a capsule file.

In some embodiments, when verification of the capsule file by the central notary system is successful, the contents of the capsule file are decrypted and made available to the presenting user. Furthermore, the central notary system of some embodiments notifies the presenting user that the contents of the capsule file are authentic and, therefore, are verified.

In some embodiments, when verification of the capsule file by the central notary system is not successful, the central notary system notifies the presenting user that verification of the capsule file contents failed. Furthermore, the central notary system of some embodiments prevents the presenting user from accessing the contents of the capsule file when the contents of the capsule file are not determined to be authentic.

In some embodiments, the central notary system always determines the identity of any user attempting to present a capsule file for certification (verification). The central notary system of some embodiments prevents (blocks or excludes) access to the contents of the capsule file for any user who is not an authorized party by the owner user.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 7 conceptually illustrates an XML Schema Definition (XSD) file by which XML serialization can be employed to generate a capsule file in some embodiments.

FIG. 8 conceptually illustrates a continuation of the XSD file of FIG. 7.

DETAILED DESCRIPTION

Figure 1:
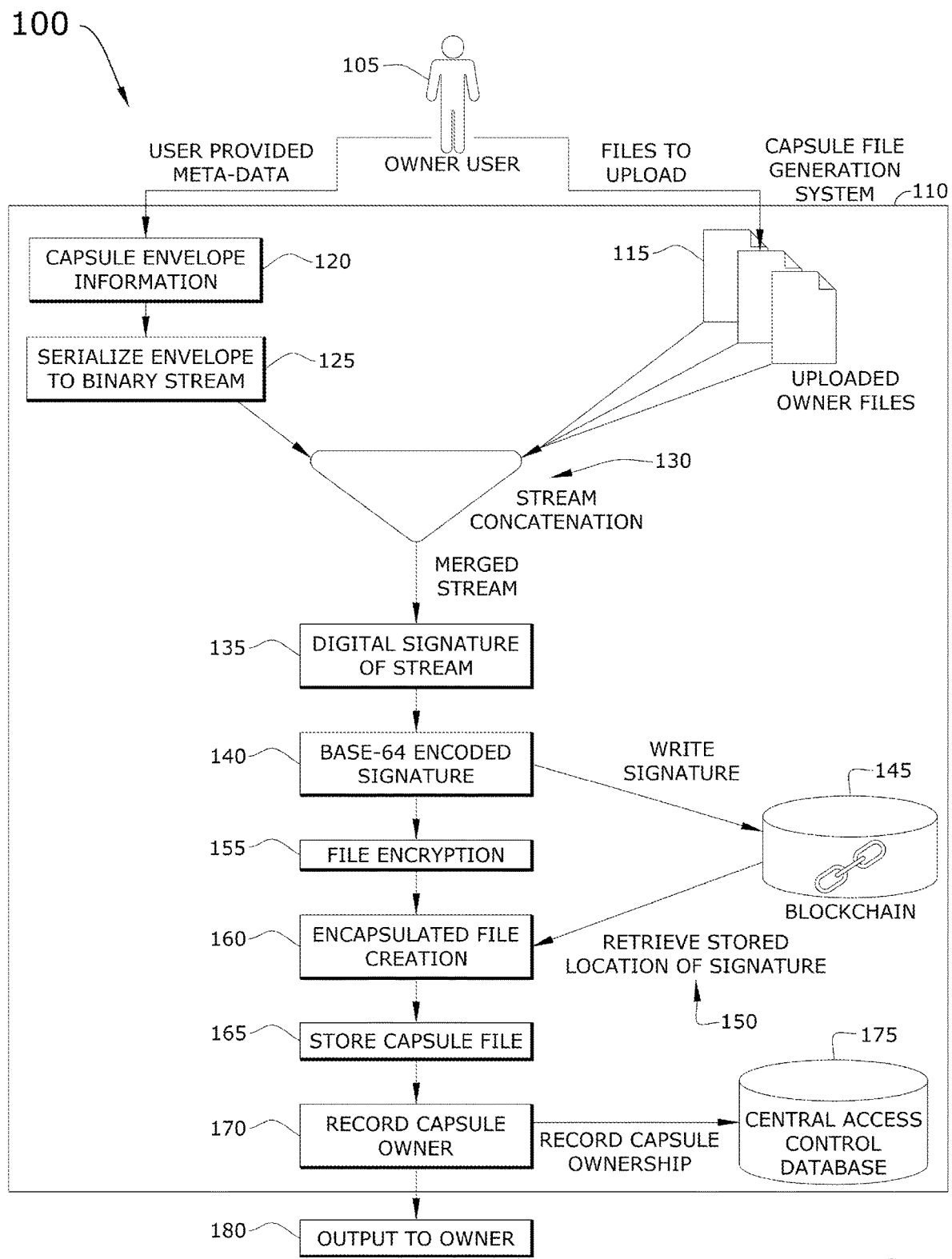
FIG. 1 conceptually illustrates a capsule file generation process performed by a capsule file generation system in some embodiments.

In the following detailed description of the invention, numerous details, examples, and embodiments of the blockchain-based data certification system and the blockchain-based data certification process are described. However, it will be clear and apparent to one skilled in the art that the invention is not limited to the embodiments set forth and that the invention can be adapted for any of several applications. In addition, the present specification defines several terms, as follows:

Blockchain—a system of arranging and storing sequenced transactions in blocks, in which each subsequent block includes a cryptographic hash of the previous block as well as a timestamp, rendering data stored on blockchains resistant to modification.

Smart Contract ("Contract")— a computer protocol intended to digitally facilitate, verify, or enforce the negotiation or performance of a contract. Smart Contracts contain programmatic rules per agreed upon by the parties to each contract. The computerized execution of these rules allows for the digitized (automated) self-execution of credible transactions between contract participants without the need to engage a third party (intermediary) traditionally required to enforce/oversee contractual performance. The recording of Smart Contracts and their corresponding transactions are trackable and immutable (irreversible). This process is ensured via certain specific smart contract blockchain technologies.

Capsule—a file, in a specific format, as produced by the present system and process, which includes one or more files and/or data in non-file format (e.g., a stored audit trail of a digital interaction), where the one or more files and/or non-file data have been securely encrypted, with the capsule file itself including an accurate timestamp of creation, a notarized hash of the file and/or non-file data contents, a location on the blockchain at which the notarized hash may be found, and (optionally) additional envelope metadata.

Time Stamping—an act of dating an action, with an accuracy that is within five seconds Coordinated Universal Time (UTC) is assumed as a time standard, and the NIST NTP time server is used as the time authority. However, a person of ordinary skill in the art would appreciate that other time authorities and standards may be interchangeably relied on.

ISO-8601—a global standard for time and date representation as a human-readable string, as issued by the International Organization for Standardization (ISO) (published at https://www.iso.org/iso-8601-date-and-time-format.html).

Encryption (of Capsule file content)—the contents of the capsule are encrypted by appropriate, off-the-shelf encryption technologies at the time of generation (e.g., AES xxx CBC mode).

Hash Message Authentication Code (HMAC)—a cryptographic practice which includes simultaneously verifying the data integrity and authentication of a message, through a cryptographic algorithm which, inter-alia, derives two keys (inner and outer) from a secret key, followed by passing the unencrypted message and inner key through a cryptographic hash, and then by deriving the final HMAC hash from the interim hash and the outer key.

HMAC SHA2-256—an HMAC algorithm constructed utilizing the SHA-256 bit hashing algorithm.

Notary—a computer system described in this disclosure which allows for the creation and verification of Capsules, and controls access to such Capsules.

(Capsule) Presentation—an act of presenting a Capsule to the Notary at some point in time after Capsule Generation.

Authorized Party (to a Capsule)—a user to whom an owner of the Capsule ("Capsule Owner") has permitted access to read, extract, and verify the contents of the Capsule.

(Digital) Signature—a NIST-approved cryptographic digital signature algorithm, such as HMAC SHA2-256.

Notarized Hash—a base-64 representation of a NIST-approved cryptographic digital signature, as produced by the Notary.

Digital Notarization (of a file)—an act of identifying that a Digital Notary has read the contents of a file, and has certified the contents of the file, by way of a Digital Signature, such as a Hash Message Authentication Code (e.g., HMAC SHA2-256).

Verification (of a Capsule)—proof of the authenticity of the contents of a Capsule, using appropriate, industry standard cryptographic digital signing algorithms (e.g., HMAC SHA2-256) that were utilized at the time of Capsule generation.

Envelope—data, including metadata, presented in a specific in-memory structure or serialized to a structured file format, which adds both user-provided data, and additional data inserted by the Notary in the context of the creation of a Capsule.

Merged Stream—the stream produced from the sequential combination of one or more File streams, optionally with a Stream representing Envelope data.

Target User—a user specifically identified by a Capsule Owner, to whom shared access to a Capsule is permitted or revoked.

Some embodiments of the invention include a novel blockchain-based data certification system that encapsulates, encrypts, notarizes, and verifies user file data using a blockchain and a novel blockchain-based data certification process for centralized user file encapsulation, encryption, notarization, and verification using a blockchain.

In some embodiments, the blockchain-based data certification system that encapsulates, encrypts, notarizes, and verifies user file data using a blockchain includes a capsule file generation system, a central notary system, a central user access control database, and a blockchain.

In some embodiments, the blockchain-based data certification process provides a capsule file generation process for centralized user file encapsulation, encryption, notarization, and verification using a blockchain. In some embodiments, the capsule file generation process includes a plurality of steps comprising (i) selecting and uploading one or more files, by an owner user, to a centralized and trusted notary system ("centralized notary system"), (ii) authenticating identity of the owner user by the centralized notary system, (iii) applying a contemporary, NIST-approved cryptographic digital signature to the one or more files, (iv) storing the cryptographic digital signature onto a blockchain record, (v) storing, onto the same blockchain record, a timestamp of an accurate time at which the cryptographic digital signature is stored onto the blockchain record, and (vi) generating a capsule file as a single file that includes the cryptographic digital signature, the timestamp, a storage location identifier reported by the blockchain that identifies a storage location of the blockchain record, and either an encrypted representation of the one or more files uploaded by the owner user or the entire encrypted content of the one or more files uploaded by the user. In some embodiments, no compression is applied during creation of the capsule file prior to encryption.

In some embodiments, the capsule file is made available to the owner user after the blockchain-based data certification process generates the capsule file. In this way, the owner user can store the capsule file on or transfer the capsule file to a storage medium of the owner user's choosing. For example, the owner user can download the capsule file to a private storage device of the owner user or transfer the capsule file to a cloud storage unit or cloud database of the owner user's choosing.

In some embodiments, the owner user of the capsule file can selectively share the capsule file with other users as authorized by the owner user. In some embodiments, the owner user informs the central notary system of the identity of each other user with whom the owner user intends to share the capsule file. For each other user, the owner user presents the central notary system of some embodiments with an email address as the identity. In some embodiments, the central notary system confirms the identities and sets the other users as authorized parties to share the capsule file. In some embodiments, the blockchain-based data certification process provides a capsule file access granting process for the owner user to share access to the capsule file with one or more target users.

In some embodiments, the owner user and each authorized party is able to present the capsule file to the central notary system for certification. For instance, after the capsule file is generated, the owner user may selectively share the capsule file with other users (who are then identified by the central notary system as authorized parties), and each user (i.e., the owner user and each of the authorized party users, all of which are also individually referred to as a "presenting user" or collectively as "presenting users") may present the capsule file to the central notary system to determine whether the contents of the capsule file presented are authentic, and specifically, to certify that the contents of presented capsule file have not been tampered with. In some embodiments, the central notary system certifies the capsule file by recomputing the cryptographic digital signature of the contents of the presented capsule file, and by confirming that the date asserted, and the cryptographic digital signature computed based on the contents of the capsule file are in agreement with the cryptographic digital signature and timestamp stored in the blockchain record at the storage location on the blockchain, which has been indicated within the information stored in the presented capsule file. Collectively, these steps are referred to as capsule file verification (or simply, "verification"). In some embodiments, the blockchain-based data certification process provides a capsule file verification process to perform the steps to verify and certify a capsule file.

In some embodiments, when verification of the capsule file by the central notary system is successful, the contents of the capsule file are decrypted and made available to the presenting user. Furthermore, the central notary system of some embodiments notifies the presenting user that the contents of the capsule file are authentic and, therefore, are verified.

In some embodiments, when verification of the capsule file by the central notary system is not successful, the central notary system notifies the presenting user that verification of the capsule file contents failed. Furthermore, the central notary system of some embodiments prevents the presenting user from accessing the contents of the capsule file when the contents of the capsule file are not determined to be authentic.

In some embodiments, the central notary system always determines the identity of any user attempting to present a capsule file for certification (verification). The central notary system of some embodiments prevents (blocks or excludes) access to the contents of the capsule file for any user who is not an authorized party by the owner user.

Embodiments of the blockchain-based data certification system and the blockchain-based data certification process described in this specification solve the problems facing traditional centralized databases, cloud storage systems, and encryption-capable systems by utilizing a hybridization of both cloud and blockchain storage mechanisms, which allows for cost-effective and suitably performing certification of large amounts of data. Furthermore, the generation of a capsule file allows for users to store both the data payload and its digital notarization. The system then allows for users to share the capsule file with others, by way of a central notary system that enforces user permissions and checks identity, and upload the capsule file for verification of authenticity at a later point in time (e.g., for certification of authenticity of capsule file contents).

Embodiments of the blockchain-based data certification system and the blockchain-based data certification process described in this specification differ from and improve upon currently existing options. While some immutable data storage systems strive to rectify vulnerabilities in traditional centralized databases and cloud storage systems with blockchain technology, they tend to exhibit poor performance in regard to latency, throughput, and cost, specifically related to storage of large amounts of data on a blockchain. In contrast, the blockchain-based data certification system and the blockchain-based data certification process described in this specification utilize a hybridization of both cloud and blockchain storage mechanisms, which allows for cost-effective certification of large amounts of data at a suitable performance level. Furthermore, the generation of the capsule file allows for users to store both the data payload and its digital notarization. The blockchain-based data certification system includes a central notary system which allows for users to share the capsule file with others and upload it for verification of authenticity at a later point in time.

To make the blockchain-based data certification system and the blockchain-based data certification process of the present disclosure, one may select a blockchain (e.g., public, private, or another form of distributed ledger blockchain technology) upon which the NIST-approved digital signature is recorded. Furthermore, the capsule file may be configured to contain just one file, many files, or data stored in a non-file format depending upon the business needs of the software implementation. Once the final output of the blockchain-based data certification system and the blockchain-based data certification process is generated (the output being a capsule file), the storage method of that capsule file (e.g., cloud storage within the central notary system, alternative cloud storage, personal storage on the user's desktop, etc.) is also flexible and optional.

Embodiments of the blockchain-based data certification system and the blockchain-based data certification process cover several other or additional aspects.

Some embodiments of the blockchain-based data certification system and the blockchain-based data certification process provide for (a) time-stamping, (b) notarizing, and (c) encryption of files, by permitting a user in possession of the files (Owner) to submit the files to a centralized, Internet-based computer system (a Central Notary System) which is trusted by the Owner to perform the (a) time-stamping, (b) notarizing, and (c) file encryption processes. Collectively, the (a) time-stamping, (b) notarizing, and (c) file encryption processes are termed "Generation" of the Capsule file. The Generation of the Capsule file method excludes the use of compression on the enclosed files, prior to encryption, to avoid known security vulnerabilities in compressed, then encrypted file content.

Some embodiments of the blockchain-based data certification system and the blockchain-based data certification process describe a file format which bundles the time-stamped, encrypted and notarized file content ("Capsule") to be made available to the original Owner for further storage at the Owner's discretion.

Some embodiments of the blockchain-based data certification system and the blockchain-based data certification process provide a method of verifying the authenticity of any existing Capsule file, by transmitting any electronic copy of the Capsule file to the Notary system which previously generated the Capsule. Specifically, the Notary system shall prove whether the same file content presented for Verification is exactly the same content as presented to the Notary at the time of Capsule creation.

Some embodiments of the blockchain-based data certification system and the blockchain-based data certification process provide a method of preventing access to file content contained in a Capsule, unless the Capsule is presented to the Notary, and the Capsule has satisfactorily been verified, and decrypted by the Notary.

Some embodiments of the blockchain-based data certification system and the blockchain-based data certification process provide a method of restricting access to the contents of Capsules to Authorized Parties, by allowing the Capsule's original Owner to inform the Notary of the current access control list of authorized users to the Capsule. This access control shall be enforced by the Notary.

To use the blockchain-based data certification system and the blockchain-based data certification process of the present disclosure, one may utilize the blockchain-based data certification system and the blockchain-based data certification process to store, immutably certify, encrypt, and securely distribute files or data which a user or collection of users deem to be important, confidential, or otherwise worthy of secure handling. A user of the blockchain-based data certification system and the blockchain-based data certification process may leverage the central notary system, either as a direct user of the software platform or through another implementation of the central notary system (e.g., through another application which integrates the central notary system via a RESTful API) to upload files or present data in a non-file format to be certified and stored in a capsule file. The deployment of the blockchain-based data certification system and development of software that implements the blockchain-based data certification process may customize a variety of attributes and settings concerning capsule file management. The blockchain-based data certification system and the blockchain-based data certification process ultimately produce a fully encrypted capsule file which, by nature of being certified and time-stamped with immutable blockchain technology, exhibits enhanced tamper-proof characteristics and data authenticity, which the user may utilize for secure storage, access, and sharing of the files which they choose to be encapsulated. Also, the blockchain-based data certification system and the blockchain-based data certification process can be used as a stand-alone notarization of the capsule output file.

Additionally, the blockchain-based data certification system and the blockchain-based data certification process may be adapted for use in any industry or in any workflow requiring the encrypted storage, encryption, and tamper-resistant sharing of files and data. By utilizing a hybridization of both cloud and blockchain storage mechanisms, the blockchain-based data certification system and the blockchain-based data certification process allows for the performant and cost-effective certification of large amounts of data.

By way of example, FIG. 1 conceptually illustrates a capsule file generation process 100 performed by a capsule file generation system 110. As shown in this figure, the capsule file generation process 100 is performed by the capsule file generation system 110 in connection with an owner user 105 who intends to create a single capsule file encapsulating one or more notarized and certified files. Specifically, the owner user 105 is in possession of one or more files which the owner user 105 intends to make certified through a centralized computer system (or "central notary system") which is trusted by the owner user 105. Similarly, the central notary system needs a way to identify the owner user 105 and trust that repeated identification of the owner user 105 is authentic. Therefore, as a prerequisite, the owner user 105 establishes his or her identity to the central notary system by way of a suitable authentication mechanism. Any of several suitable authentication methods are known in the in the state of the art. For example, authenticating identity of owner user 105 by providing a username and a password to the central notary system using the HTTPs protocol, or by the central notary system requiring a method of multi-factor authentication. For instance, a two-factor authentication scheme, whereby the owner user 105 may be authenticated by something the owner user 105 knows (e.g., a password associated with a username) and something the owner user 105 has (e.g., a mobile device, to which the central notary system sends a text message with a "secret" code which the owner user 105 must echo back to the central notary system by some mechanism, such as inputting the code into an interface that has a connection to the central notary system).

In some embodiments, the owner user 105 interfaces with the capsule file generation system 110 to provide the one or more files to the central notary system. The owner user 105 may upload the one or more files to the central notary system over a computer network. In some embodiments, the computer network comprises a private local area network. In some embodiments, the computer network comprises a public network, such as the Internet. In some embodiments, the computer network comprises a private cloud network accessed over the wider Internet.

In some embodiments, notarization and certification by the central notary system can begin after the one or more files are uploaded ("uploaded owner files 115") to the capsule file generation system 110. However, in some embodiments, the owner user 105 provides additional information related to the uploaded owner files 115. The additional information may include, for example, metadata or envelope data collectively pertaining to the uploaded owner files 115. The information provided in the metadata or envelope data may include descriptive name(s) and/or details of the collection of uploaded owner files 115. For example, if the uploaded owner files 115 are related to a fire and associated insurance claim, the metadata or envelope data may include a description such as "Documents and photographs pertaining to fire damage, December 2018".

As shown in this figure, the owner user 105 provided metadata is received by the capsule file generation system 110 as capsule envelope information 120. In some embodiments, the contents of the envelope, namely, the capsule envelope information 120, is serialized to a binary stream of bytes 125. The serialization mechanism includes an industry-standard serialization algorithm. In some embodiments, the JavaScript Object Notation (JSON) serialization standard may be applied to an in-memory structure representing the envelope with the capsule envelope information 120, utilizing a UTF-8 byte encoding stream to obtain a repeatable byte stream representation of the envelope with the capsule envelope information 120. In some other embodiments, serialization of the capsule envelope information 120 of the envelope is undertaken by the Google Protocol Buffers serialization standard which transforms the capsule envelope information 120 from the in-memory representation of envelope to a binary byte stream.

Next, at stream concatenation 130, the uploaded owner files 115 will be presented as binary streams representing the exact byte content of each file, and merged into one, continuous stream (a "merged stream") that includes the stream of bytes from the first uploaded owner file in its entirety, followed by the stream of bytes from the second uploaded owner file, and so forth, until the stream of bytes from the last uploaded owner file among the uploaded owner files 115 is appended to the continuous stream. When the owner user 105 provided metadata about the uploaded owner files 115, the serialized byte stream 125 of the envelope are then appended to the end of same continuous steam, after the stream of bytes from the last uploaded owner file is concatenated into the merged stream. The method of presenting, and encoding, the uploaded owner files 115 (and when provided for, the serialized byte stream 125) as a continuous merged stream of bytes can be any deterministic, repeatable, and reversible encoding method. An example of concatenating the file byte streams of the uploaded owner files 115 and the serialized byte stream 125 of the envelope is described further below, by reference to FIG. 2.

From the merged stream, the capsule file generation process 100 obtains a digital cryptographic signature (or "digital signature"). In some embodiments, the capsule file generation process 100 obtains the digital signature by way of the Hash Message Authentication Code (HMAC) utilizing the Secure Hash Algorithm 2 with 256 bit digest (HMAC-SHA2-256). During this process, a signing secret (or "secret key") of agreeable length is applied by the digital signature algorithm (e.g., HMAC-SHA2-256 or another algorithm). In some embodiments, the central notary system secures the signing secret and restricts access to the signing secret. In some embodiments, the HMAC-SHA2-256 algorithm is utilized and a secret key length of sixteen bytes is agreeable. For example, the following secret byte sequence could be used as the signing key for the digital signature:

0x0 0x01 0x02 0x03 0x04 0x05 0x06 0x07 0x08 0x09 0xA 0xB 0xC 0xD 0xE 0xF

In some other embodiments, the more recent HMAC-SHA3-512 algorithm may be utilized to compute the digital signature of the merged stream.

In some embodiments, the capsule file generation process 100 outputs a sequence of bytes representing the output of the digital cryptographic signature ("digital signature of stream 135"). For example, when the digital cryptographic signature is computed based on the HMAC-SHA2-256 algorithm, output of sixteen bytes is produced for the digital signature of stream 135. Next, the capsule file generation process 100 obtains a base-64 encoded signature 140. The base-64 encoded signature 140 (or "notarized hash 140") is obtained by encoding the output digital signature of stream 135 to an ASCII encoded string by using the base-64 encoding algorithm, thereby allowing the notarized hash to be represented as a string.

In some embodiments, the capsule file generation process 100 then writes the notarized hash 140, in base-64 format, to the blockchain 145. The notarized hash 140 can be recorded to the blockchain in different ways according to different blockchain implementations. In some embodiments, the notarized hash 140 is recorded to a private Ethereum Blockchain, abstracted with the Microsoft Azure Blockchain Workbench, utilizing an applicable Smart Contract capable of writing the base-64 encoded notarized hash 140 as a string parameter to a transaction. In some other embodiments, the notarized hash 140 is recorded to the public ETH Ethereum Blockchain (Mainnet), utilizing a suitable Smart Contract transaction which accepts as a parameter the string representation of the base-64 formatted notarized hash 140. In still other embodiments, the notarized hash 140, in base-64 format, is written as an ASCII encoded string on the Bitcoin public blockchain (BTC), utilizing a technique known in the art (e.g., a technique such as described in https://medium-.com/blockchain-education-network/how-to-write-stuff-on-the-blockchainbdae1704f24d; while this technique works, this technique nevertheless is generally discouraged as this technique is regarded by many as vandalism of Bitcoin).

After obtaining the notarized hash 140, in base-64 format, or concurrently with recording the base-64 formatted notarized hash 140, the capsule file generation process 100 of some embodiments performs file encryption 155 by individually encrypting the original one or more files provided to the capsule file generation system 110 and, accordingly, to the central notary system, by the owner user (the uploaded owner files 115). In some embodiments, the file encryption 155 is performed by utilizing an NIST-approved encryption algorithm. The file encryption 155 may utilize either symmetric (secret key) or asymmetric (public/private key pair) encryption technology. In some embodiments, the key length of the secret must be of agreeable length to the encryption algorithm used. For example, when the NIST-approved encryption algorithm is SHA2-256 algorithm, then a key length of sixteen bytes is agreeable. While any NIST-approved encryption algorithm may be utilized, in at least one embodiment, the uploaded owner files 115 will be individually encrypted using the symmetric Advanced Encryption Standard (AES), of key length 256 bits (FIPS PUB 197), applied in a Cipher Block Chaining (CBC) configuration with an assigned cryptographically random sixteen byte Initialization Vector (IV) specific to each file. In some embodiments, the IV may be stored alongside the encrypted file stream.

In some embodiments, when the notarized hash 140, in base-64 format, is successfully recorded to the blockchain 145, the capsule file generation process 100 of some embodiments retrieves the storage location 150 of the stored transaction (or recorded block) with the recorded base-64 formatted notarized hash 140. In some embodiments, the blockchain 145 presents the storage location 150 to the central notary system by the blockchain 145 as a reference storage location that includes referencing information applicable to the particular blockchain implementation utilized by the capsule file generation system 110. Specifically, when a private Ethereum blockchain implementation is utilized, as abstracted with Microsoft Azure Blockchain Workbench, the referenced storage location includes the workbench Contract ID, the Contract Action ID, and the Ethereum Transaction Address. However, when the public Ethereum Blockchain (Mainnet) is utilized, the referenced storage location includes the Smart Contract Address, the Block ID containing the transaction created, and the Transaction Hash identifier of the transaction created for the storage. On the other hand, when the Bitcoin public Blockchain is utilized, the referenced storage location includes the transaction ID of the successful transaction.

In some embodiments, the capsule file generation process 100 starts encapsulated file creation 160. Specifically, the capsule file generation process 100 creates the encapsulated file with the encrypted file content(s) produced from file encryption 155, the base-64 encoded notarized hash 140, retrieved storage location 150 of the notarized hash 140 recorded on the blockchain 145, and (when provided by the owner user 105) the original capsule envelope data 120. These items are composed into a single encapsulated file, which includes all information provided, computed, and encrypted in any of the prior steps and operations of the capsule file generation process 100. Thus, when the capsule file generation process 100 performs encapsulated file creation 160, a single output file is produced (a "capsule file" or simply, a "capsule"). In some embodiments, the central notary system of the capsule file generation system 110 provides a unique identifier for each capsule file produced (a "capsule ID").

In some embodiments, the capsule file generation process 100 produces the single output capsule file by XML Serialization of all the items (i.e., the encrypted file content(s) produced from file encryption 155, the base-64 encoded notarized hash 140, retrieved storage location 150 of the notarized hash 140 recorded on the blockchain 145, and, when provided by the owner user 105, the original capsule envelope data 120) and all the information as provided, computed, and encrypted, in accordance with an XML Schema Definition (XSD), while the capsule ID is generated by a cryptographically secure random number generator. An example of an XML file that describes a serialized capsule file is described below, by reference to FIG. 3. An example of an XML Schema Definition (XSD) file is described below, by reference to FIGS. 7-8.

After creating the capsule file, the capsule file generation process 100 of some embodiments allows the owner user 105 to determine an action to take on the newly produced capsule file. For instance, the owner user 105 may elect to store the capsule file or download the capsule file. In some embodiments, when the owner user 105 elects to store the capsule, the capsule file generation process 100 stores the capsule file in a storage unit that is directly managed and secured by the central notary system. In some embodiments, when the owner user 105 elects to store the capsule, the capsule file generation process 100 first transfers the capsule file to a cloud storage unit specified by the owner user 105, and proceeds to store the capsule file in the specified cloud storage unit. For example, the owner user 105 may specify a cloud storage unit on Google Drive, Microsoft One Drive, Dropbox, etc.

In some embodiments, the capsule file generation process 100 audits the capsule file creation by recording the capsule owner 170. Specifically, to enable the owner user 105 to access the capsule file contents, the central notary system records, in a centralized access control database 175, both (i) the identity of the capsule owner (e.g., the identity of owner user 105) and (ii) the act of capsule file creation. For example, the central notary system may record the unique capsule ID and an email address of the owner user 105 in the centralized access control database 175, which may be a relational database or another kind of database. In some embodiments, this ends the capsule file generation process 100. However, in some embodiments, the owner user 105 may elect to download the capsule file, either after the performing the encapsulated file creation 160 which produces the capsule file or after recording the capsule owner 170 in the centralized access control database 175. In some embodiments, when the owner user 105 elects to download the capsule file, the capsule file generation process 100 outputs the capsule file 180 to the owner user 105. In some embodiments, the capsule file generation process 100 also deletes all residual and transient file data uploaded to, and produced by, the central notary system when the owner user 105 has elected to download the capsule file.

Figure 2:
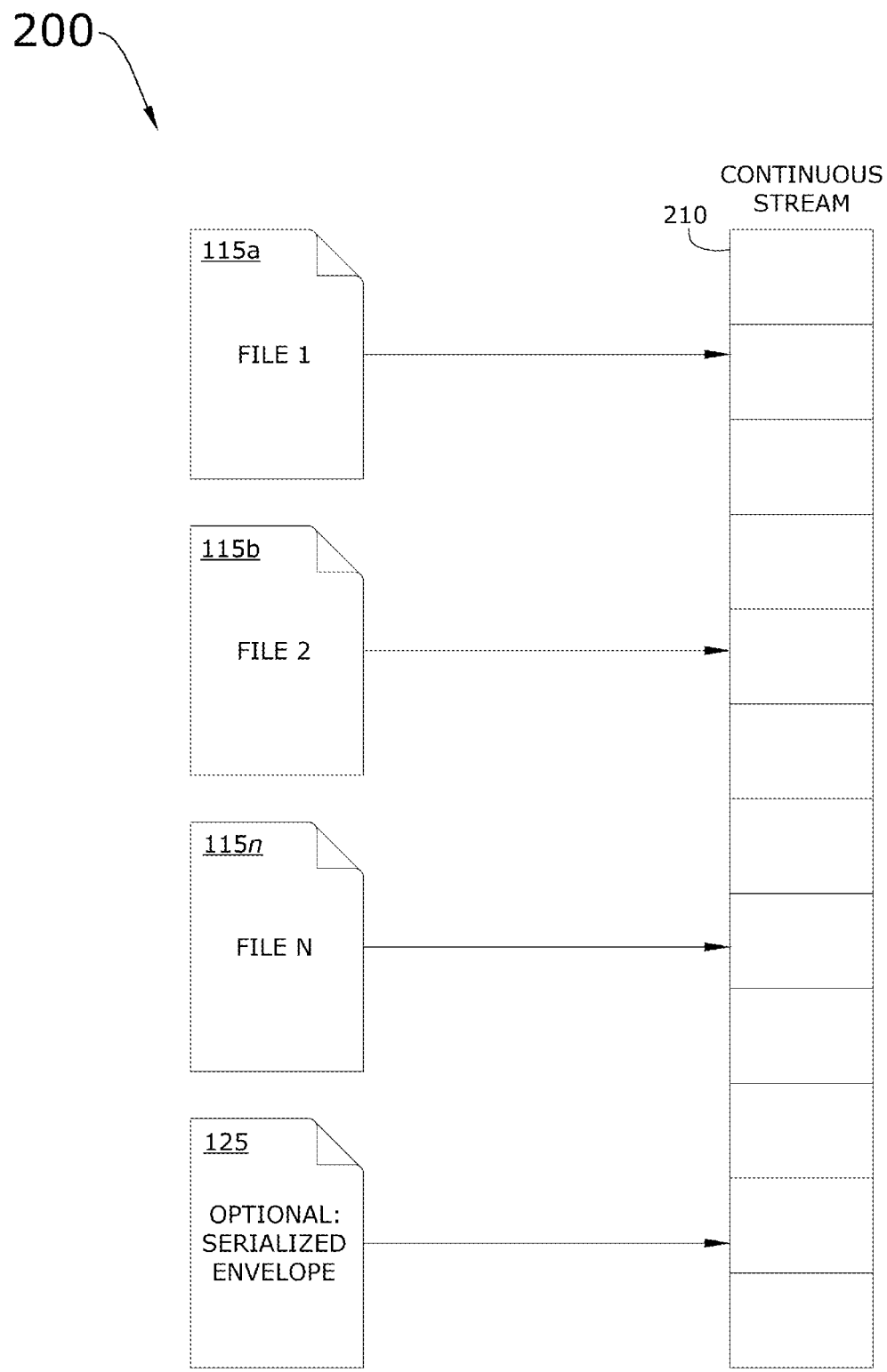
FIG. 2 conceptually illustrates a schematic of assimilation of a merged stream of concatenated owner files and serialized envelopes of owner-provided information in some embodiments.

By way of example, FIG. 2 conceptually illustrates a schematic of assimilation of a merged stream of concatenated owner files and serialized envelopes of owner-provided information in some embodiments. As shown in this figure, a plurality of original files 115a, 115b, . . . , and 115n have been uploaded by the owner user 105. In addition, the owner user 105 has provided the optional envelope information (metadata that is serialized as a byte stream 125) related to the plurality of original files 115a, 115b, . . . , and 115n. Before performing file concatenation and creating the merged stream, the envelope information provided by the owner user 105 is serialized, to provide a serialized byte stream 125 envelope, which includes with a binary byte stream of the metadata/information provided by the owner user 105. As shown here, a continuous stream of bytes 210 is created by concatenating the byte streams of the 115a, 115b, . . . , and 115n and the serialized envelope 125. Stream concatenation is valid so long as the method of presenting, and encoding, the plurality of original files 115a, 115b, . . . , and 115n and the serialized byte stream 125 envelope provided by the owner user 105 as a continuous stream of bytes 210 is a deterministic, repeatable, and reversible encoding method.

Figure 3:
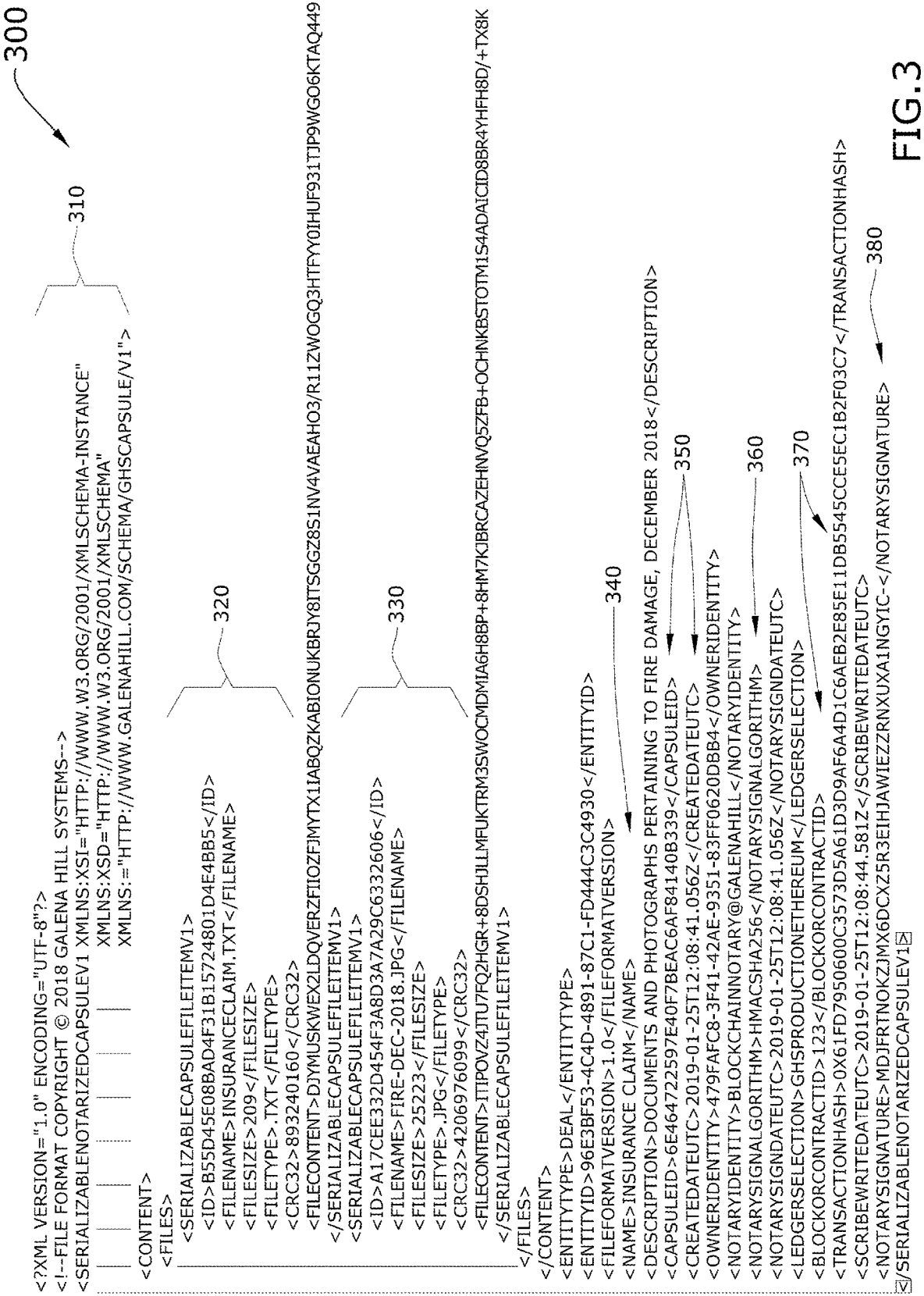
FIG. 3 conceptually illustrates an XML, file that describes a format of a serialized generated capsule in some embodiments.

Now turning to another example, FIG. 3 conceptually illustrates an XML file 300 that describes a format of a serialized generated capsule. As shown in this figure, the XML file 300 represents a generated capsule file related to an insurance claim made by a covered owner to the insurance company regarding fire damage to a residence covered by the insurance policy. The information in the XML file 300 includes capsule XML data 310, information for the insurance claim including encapsulated files of email text 320 and a photographic file attachment 330, metadata information 340, additional central notary system-provided information 350, digital signature information 360, blockchain storage location data 370, and notary signature record output information 380.

Specifically, the capsule XML data 310 includes capsule copyright information and schema URL references for defining the format of the capsule file. The information for the insurance claim includes data that provides information pertaining to the files uploaded by the owner (e.g., uploaded owner files 115) as they are embedded in the capsule file and information discovered and as expanded upon by the central notary system for each of the uploaded owner files. The expanded information includes file content encrypted by the central notary system and embedded in the capsule by the central notary system. In this example, the expanded information includes the email text 320 covering a note to the insurance claim by the covered owner to the insurance company. This email text 320 is supported by another encapsulated file of the photographic file attachment 330 taken by the covered owner in support of the insurance claim and is an image file in JPG format with content that illustrates the fire damage. The metadata information 340 is serialized capsule envelope data and provides the information supplied by the covered owner (the supporting, optional envelope metadata) to augment and provide further context to the information recorded in the capsule. The additional central notary system-provided information 350 includes additional information specified by the central notary system, such as the capsule ID (which is the unique identifier of the capsule file), the timestamp of capsule creation, and the owner ID (which is the notary's identifier for the identity of the owner). The digital signature information 360 provides a record of the central notary system's identity, the specific algorithm utilized in the digital signature process, and the timestamp at which the central notary system performed the process of digital signing. The blockchain storage location data 370 provides a record of the blockchain storage location at which the notarized hash has been recorded. In this example, the blockchain is identified as "GHSPRODUCTIONETHEREUM" which related to a specific blockchain implementation (e.g., "GHS Systems Private Production Blockchain"). The blockchain block identifier is "123" and the smart contract transaction resulting from the act of recording the notarized hash on the blockchain by way of a custom smart contract. Additionally, the timestamp at which the notarized hash was written to the blockchain is recorded. While the exact time is preferred, it is recognized that the time taken to complete a transaction on many public blockchains, such as Ethereum or Bitcoin, varies. Finally, the notary signature record output information 380 includes data that demonstrates the requirement to record the output of the encapsulation process (the output being the capsule file as a base-64 encoded notarized hash as calculated by, for example, the capsule file generation process 100 performed by the central notary system of the a capsule file generation system 110).

After an encapsulated capsule file is generated, for example, by the capsule file generation process 100 described above by reference to FIG. 1, it is possible for the owner user 105 of the capsule file to share access to the contents of the capsule file. To share the contents of the capsule file, however, the owner user needs to authorize specific other users to access the capsule file before such other users can obtain access to the contents of the capsule file. In some embodiments, the central notary system provides the ability for the owner user to set access rights for specific other users in connection with specific capsule file(s). This is accomplished by way of a capsule file access rights setting process in which the owner user connects to the central notary system and proceeds through steps including (i) selecting a particular capsule file, (ii) identifying one or more target users with which to share the particular capsule file, (iii) setting access rights to the particular capsule file for the identified target users, (iv) recording information about the access rights, the identified target users, and the particular capsule file in a central access control database, and then (v) notifying the identified target users of their own ability to access the contents of the particular capsule file.

Figure 4:
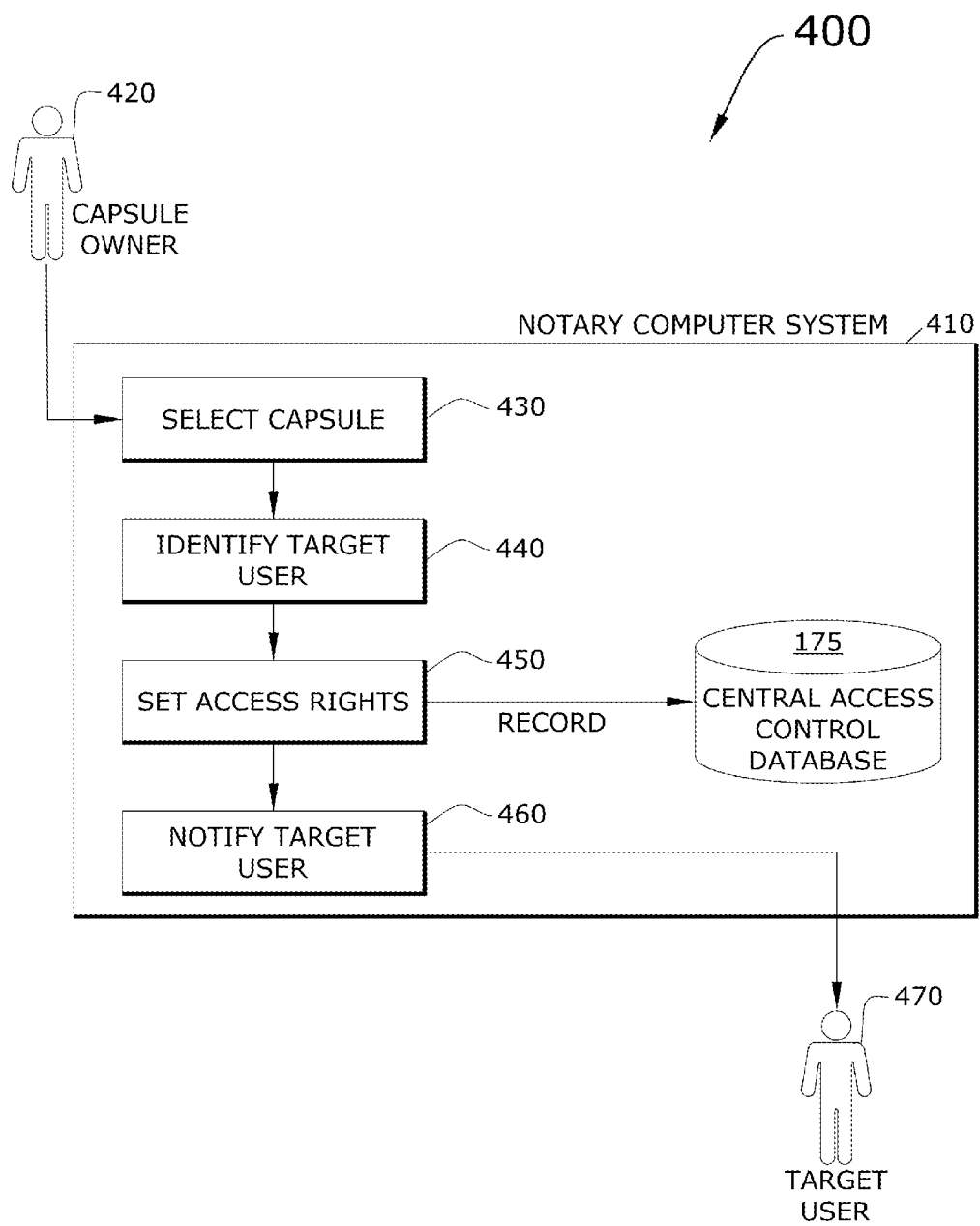
FIG. 4 conceptually illustrates a capsule file access rights setting process performed by a central notary system through which a capsule owner sets access rights to a capsule file for a target user in some embodiments.

By way of example, FIG. 4 conceptually illustrates a capsule file access rights setting process 400 performed by way of a central notary system 410 through which a capsule owner 420 sets access rights to a capsule file for a target user 470. As shown in this figure, the capsule file access rights setting process 400 starts when the capsule owner 420 connects to the central notary system 410 (either via local network connection or over the Internet). As prerequisite for the capsule owner 420 to start the capsule file access rights setting process 400, the identity of the capsule owner 420 must be authenticated and verified as noted above (e.g., username/password login credentials, two-factor authentication method, or other multi-factor authentication method).

After having established the identity of the capsule owner 420 to the satisfaction of the central notary system 410, the capsule file access rights setting process 400 can begin by the capsule owner 420 selecting (at 430) the particular capsule file to share. The capsule owner 420 may be the owner of several capsule files, and may therefore make a selection of the particular capsule file from among the several owned capsule files. By example, the central notary system 410 shows all such capsule files previously generated by capsule owner 420, thereby allowing the capsule owner 420 to select one capsule file (e.g., the particular capsule file) from list of capsule files listed. Similarly, the capsule owner 420 may be the owner of several previously created capsule files, but may select a newly created capsule file to share with other users immediately after creation of the new capsule file, such as by the capsule file generation process 100, as described above by reference to FIG. 1. Alternatively, the capsule owner 420 may be the owner of only a single capsule file, and the capsule file itself may have just been generated, for example, by the capsule file generation process 100 of FIG. 1.

After selecting the particular capsule file (at 430), the capsule file access rights setting process 400 of some embodiments proceeds to the next step at which the capsule owner 420 identifies and selects a target user (at 440) with whom to share access to the contents of the particular capsule file. While this example describes the selection of a single target user 470, in some cases, the capsule owner 420 may intend to share the particular capsule file with multiple target users. In some embodiments, the capsule owner 420 selects a first target user and sets access rights for the first target user before returning to identify and select a second target user and setting the access rights for the second target user, followed repeatedly for each other target user with whom the capsule owner 420 would like to share access to the contents of the particular capsule file. Also, in some embodiments, each target user 470 is identified by a known communication method, such as by an email address associated with the target user 470.

In some embodiments, the capsule file access rights setting process 400 continues to the next step of setting access rights (at 450) for the identified target user 470 to access contents of the particular capsule file. For example, the capsule owner 420 may specify that the target user has read access to the particular capsule file. It is possible for the capsule owner 420 to even specify that the target user 470 has no access rights to the particular capsule file. At least for the present moment, the target user 470 would be listed as a candidate target user with no access permissions or rights to access the particular capsule file.

After the capsule owner 420 sets the access rights for the target (at 450), the central notary system 410 records the specified access rights for the associated target user 470 in the central access control database 175. The access rights record for access to the particular capsule file by the associated target user 470 is stored in the central access control database 175. When a previous record with access rights to the particular capsule file by the associated target user 470 has been stored in the central access control database 175, the previous record is overwritten with a new updated record the includes the current specified access rights in connection with the particular capsule file.

In some embodiments, the capsule file access rights setting process 400 ends after the capsule owner 420 sets access rights for the target user 470 and those access rights are recorded in the central access control database 175. In some other embodiments, an optional communication feature is enabled to provide a courtesy communication transmission by the central notary system 410 to notify (at 460) the target user 470 of the newly granted, changed, or revoked access rights to the particular capsule file. For example, the central notary system 410 may send an email to the target user 470.

In some embodiments, the central notary system provides a capsule file verification service whereby a previously-created capsule file is presented to the central notary system by a presenting user and the central notary system attempts to authenticate contents of the previously-created capsule file, and upon successful authentication, certifies the authenticity of the capsule file and allows the presenting user to access the original file contents of the capsule file.

Figure 5:
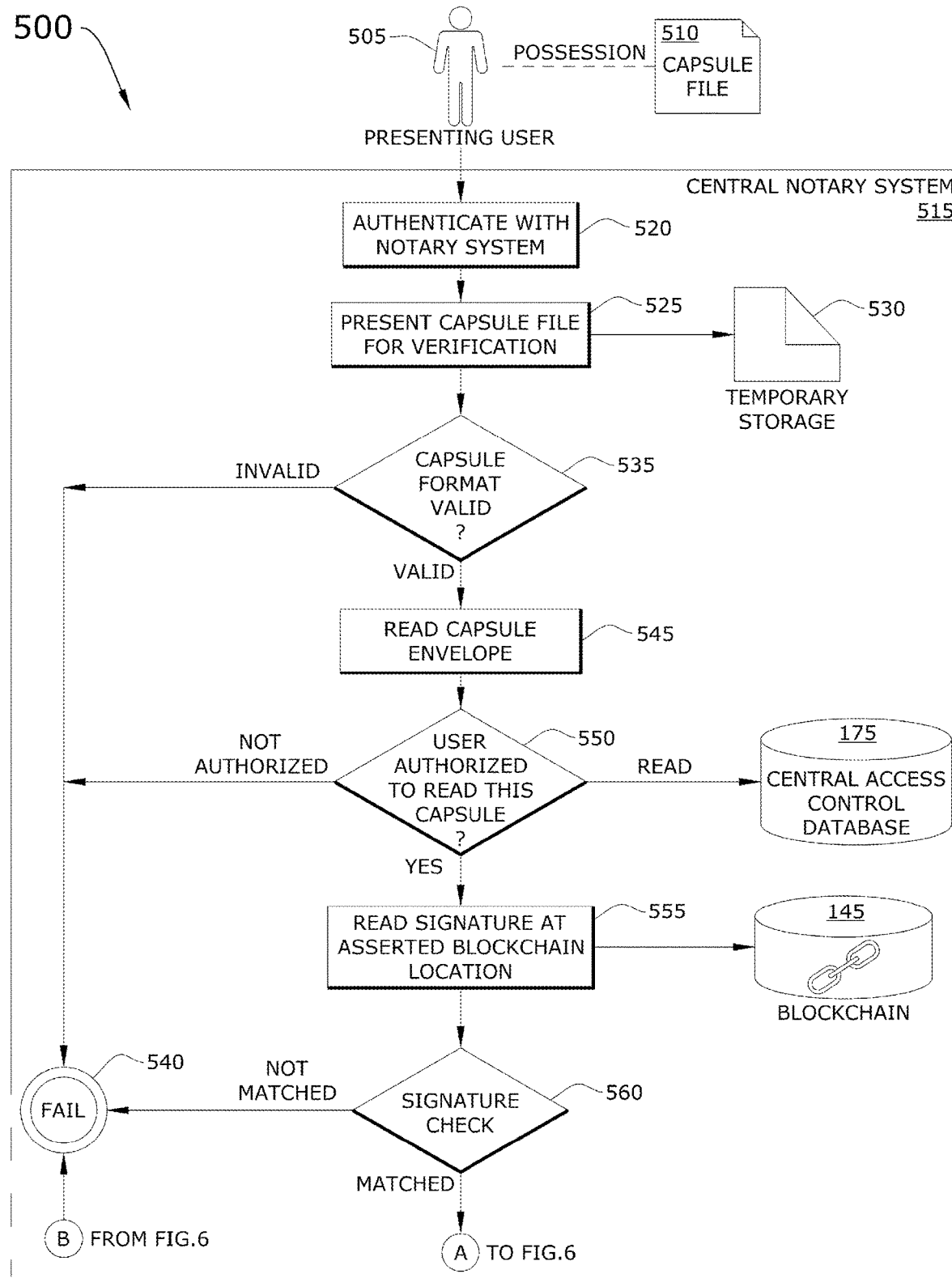
FIG. 5 conceptually illustrates a capsule file verification process performed by a central notary system in some embodiments.
Figure 6:
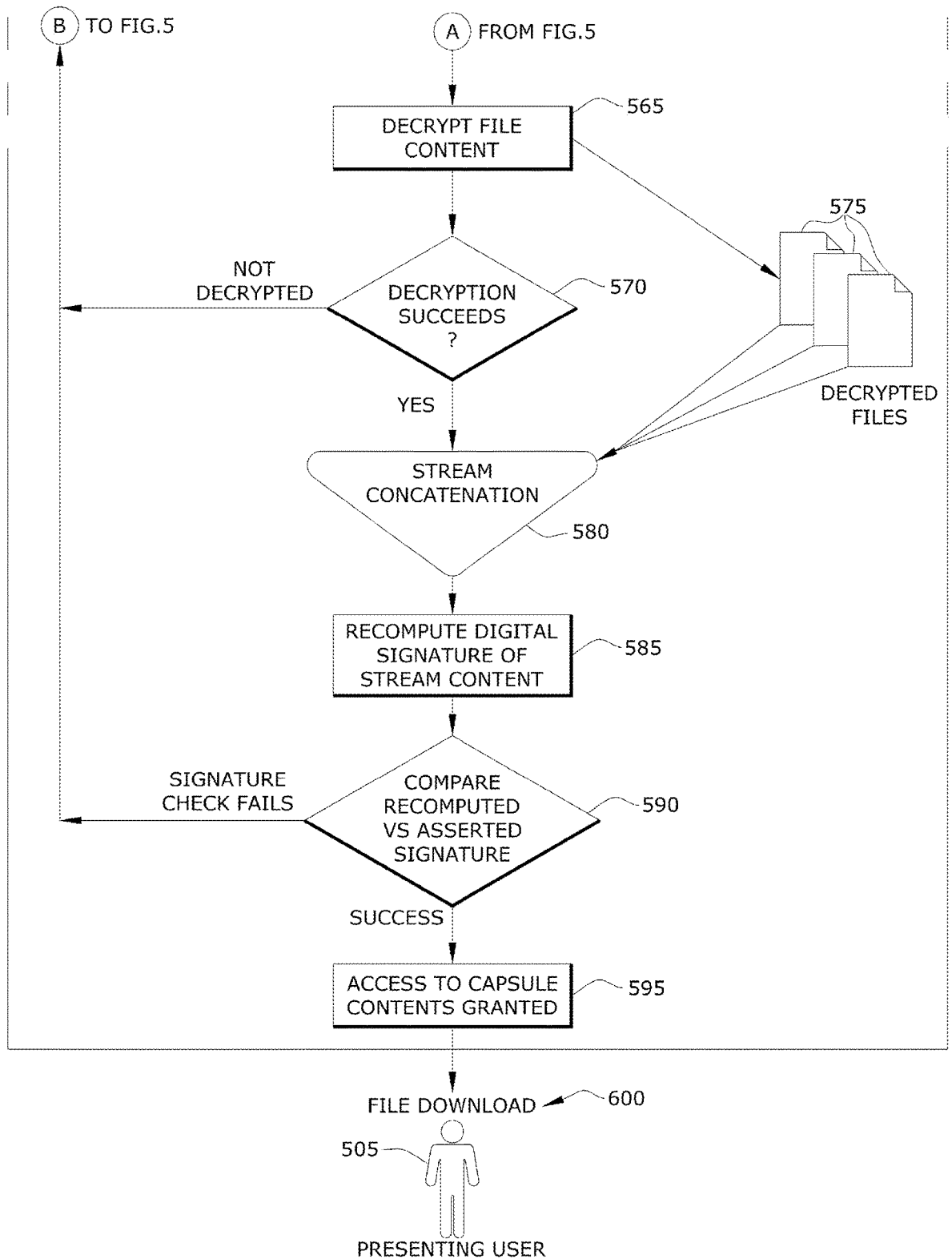
FIG. 6 conceptually illustrates a continuation of the capsule file verification process of FIG. 5.

By way of example, FIGS. 5 and 6 conceptually illustrate a capsule file verification process 500 performed by a central notary system 515 in some embodiments. As shown in this figure, the capsule file verification process 500 is triggered by a presenting user 505 who presents a previously-created capsule file 510 to the central notary system 515 for verification. The presenting user 505 may be the capsule owner (that is, the original owner user) for whom the capsule file 510 was created, such as by the capsule file generation process 100, described above by reference to FIG. 1. Instead of being the capsule owner/original owner user, the presenting user 505 may be another user who was granted access rights to the capsule file 510, such as by the capsule owner granting a target user access rights by way of the capsule file access rights setting process 400 in connection with the central notary system 410, described above by reference to FIG. 4.

In some embodiments, the capsule file verification process 500 initially performs user authentication (at 520) in connection with the central notary system. That is, the presenting user 505 first must establish his or her identity to the satisfaction of the central notary system 515. This can be done in any of the manners described above (e.g., username/password credentials authentication, two-factor authentication, multi-factor authentication, etc.). If the identity of the presenting user 505 cannot be successfully authenticated, the presenting user 505 may be authenticated a number of times before the capsule file verification process 500 ends.

On the other hand, when user authentication is successful, the capsule file verification process 500 of some embodiments proceeds to the next step at which the presenting user 505 presents the capsule file 510 to the central notary system 515 for verification (at 525). For example, the presenting user 505 may upload the capsule file 510 to the central notary system 515. In some embodiments, the central notary system 515 stores the presented capsule file 510 in temporary storage 530. Although stored in temporary storage 530, the authenticity and correctness of the file format of the capsule file 510 presented by the presenting user 505 for verification are not trusted by the central notary system 515.

Next, the capsule file verification process 500 of some embodiments determines (at 535) whether the capsule file 510 format is valid or not. In some embodiments, the central notary system 515 ascertains whether presented capsule file 510 meets the file format and schema requirements of a capsule file. This is done, for example, by application of an XML, schema definition (XSD) file schema through which an XML-serialization of the capsule file 510 is checked by the central notary system 515 for validity of the capsule file 510 format and schema correctness. An example of an XML-serialization of a capsule file is described above, by reference to FIG. 3. Furthermore, an example of an XML Schema Definition (XSD) file is described further below, by reference to FIGS. 7-8.

When the file format of the presented capsule file 510 does not comply with the format expected, then the file format is considered invalid. When the capsule file 510 format is invalid, the capsule file verification process 500 proceeds to a failure state 540 and the capsule file verification process 500 ends. In some embodiments, the central notary system 515 notifies the presenting user 505 of the reason for failure.

On the other hand, when the capsule file 510 format meets the criteria for being considered the correct file format, then the capsule file 510 format is deemed valid. When the capsule file 510 format is valid, the capsule file verification process 500 reads the capsule file 510 envelope information (at 545). In some embodiments, the capsule file verification process 500 reads the capsule file 510 envelope information by reversing the serialization process applied when the original owner user 105 uploaded the one or more files (the uploaded owner files 115) to the central file generation system 110, as described above by reference to FIG. 1. For example, if the output of the uploaded owner files 115 was arrived at by the central notary system applying JSON serialization to an in-memory representation of the envelope data, then the reverse serialization process is performed by applying JSON de-serialization, with the same encoding preferences, and the envelope data is de-serialized into the same in-memory structure as used for the uploaded owner files 115. In this way, the capsule ID (unique identifier of the capsule file 510) can be read, and the access rights and control granted by the capsule owner to the capsule file 510 can be accessed from the central access control database 175 by the central notary system 515.

In some embodiments, the capsule file verification process 500 then determines (at 550) whether the presenting user 505 is authorized to read the capsule file 510 contents. The capsule file verification process 500 reads the central access control database 175 to review the access rights granted by the capsule owner to the capsule file 510. When the presenting user 505 is not authorized to access the contents of the capsule file 510, the capsule file verification process 500 proceeds to the failure state 540 and ends without allowing the presenting user 505 to access the contents of the capsule file 510. In some embodiments, the capsule file verification process 500 notifies the presenting user 510 of the reason for the failure.

However, when the presenting user 505 is determined to be authorized to access the contents of the capsule file 510 (as by reading the access rights for the capsule file 510 set by the capsule owner and stored in the central access control database 175), the capsule file verification process 500 of some embodiments proceeds to the next step of reading the signature at the asserted blockchain location (at 555). That is, the central notary system 515 finds the blockchain storage location as identified in the capsule file 510 and then attempts to read the record of the notarized hash at the identified storage location of the blockchain 145.

After attempting to read the record of the notarized hash from the blockchain storage location identified by the capsule file 510, the capsule file verification process 500 then performs a battery of checks to determine (at 560) whether the digital signature asserted in the capsule file 510 matches the asserted record at the blockchain storage location. The battery of checks are performed by the central notary system 515, and any failure resulting from the battery of checks triggers a verification failure that leads to the failure state 540. In particular, the central notary system 515 checks whether the transaction exists at the blockchain storage location identified in the capsule file 510 and triggers a false address verification failure when the transaction does not exist at said blockchain storage location. However, when the transaction is found at the identified blockchain storage location, the central notary system 515 goes on to check whether the transaction conforms to the method and protocol of blockchain recording utilized by the central notary system 515. The central notary system 515 triggers a false protocol verification failure when the transaction does not conform to the method and protocol of blockchain recording utilized by the central notary system 515. When transaction data is found and it conforms to the central notary system 515 method and protocol of blockchain recording, the central notary system 515 performs another check of comparing the digital signature and the signature reported by the capsule file 510 as presented to the central notary system 515 for verification. When the comparison of signatures fails, the central notary system 515 triggers a non-matching signatures verification failure. However, when the transaction exists at the blockchain storage location and conforms to the method and protocol of blockchain recording utilized by the central notary system 515, and transaction data is found with matching signatures, then the central notary system 515 performs yet another check of the timestamp of the transaction to determine if the timestamp is inline with the timestamp recorded in the capsule file 510. The central notary system 515 of some embodiments permits slight differences in the timestamps, but timestamps differing by more than a threshold amount are deemed failures. For example, the timestamps may be permitted to differ by up to one minute, but any time difference of more than one minute would trigger the failure state. Accordingly any failure of any of the battery of checks would cause the capsule file verification process 500 to proceed to the failure state 540 and end. As with the other verification failure scenarios, the capsule file verification process 500 may inform the presenting user 505 of the reason for the failure. On the other hand, the capsule file verification process 500 proceeds forward when the battery of checks are all satisfied and the signatures match.

Turning now to FIG. 6, which conceptually illustrates a continuation of the capsule file verification process 500 shown in FIG. 5. As shown in this figure, the capsule file verification process 500 proceeds to a step for decrypting (at 565) the capsule file 510 content. By way of example, decrypted files 575 are shown as output from the steps for decrypting (at 565) the capsule file 510 content. Specifically, when the digital signature asserted by the presented capsule file 510 matches the asserted record located in the blockchain, then the central notary system 515 starts processing all of the files contained within the capsule file 510 by reversing the encryption of those files (such as by reversing the file encryption performed at step 155 of the capsule file generation process 100 described above by reference to FIG. 1), in order to restore the original content of the files contained within capsule file 510.

For example, when the files in the capsule file 510 were encrypted with AES 256 bit in Cipher Block Chaining, with a sixteen byte Initialization Vector (IV) stored as prepended to the encrypted file bytes in the capsule file 510, the central notary system 515 performs several operations. Specifically, the central notary system 515 reads the sixteen byte IV prepended to each file. The central notary system 515 also retrieves the signing key it would have used previously to sign the capsule file 510 content at the date and format as inferred by the capsule metadata. For example, if the central notary system 515 uses a key rotation policy, the central notary system 515 retrieves the secret key which would have been applied at the noted timestamp of notarization. Then, using the sixteen byte IV and the signing key, along with the encrypted bytes for each file, the central notary system 515 can attempt to decrypt the encrypted file content embedded within the capsule file 510. In some embodiments, the central notary system 515 decrypts all of the files concurrently to improve decryption performance. For example, when the central notary system 515 performs decryption by a computing device with a plurality of processor cores (or a number N of processor cores), then performance may be advantageously improved by concurrently decrypting a plurality of files (or N files) in the capsule file 510.

Next, the capsule file verification process 500 of some embodiments determines (at 570) whether decryption of the files 575 in the capsule file 510 succeeded. Should decryption of any files presented in capsule file 510 fail to correctly decrypt in accordance with the applicable encryption algorithm's mechanism for determining correct decryption, then the capsule file verification process 500 proceeds to the failure state 540, as the central notary system 515 fails in verification and reports the reason for the failure to the presenting user 505. However, when decryption of all files presented in the uploaded capsule file 510 is successful, the capsule file verification process 500 performs stream concatenation (at 580) in order to re-create the original digital signature, as was applied during the original capsule file generation process 100, described above by reference to FIG. 1. However, in this case, the stream concatenation (at 580) involves several sub-steps by the capsule file verification process 500, including (i) sequentially streaming each of the decrypted files, in binary format, by utilizing the same encoding (if applicable), as the encoding applied at step 135 of the capsule file generation process 100, described above by reference to FIG. 1, in the order presented by the capsule file 510, and (ii) sequentially streaming the capsule envelope metadata (as limited to such data that was previously provided and serialized in the capsule envelope information 120, described above by reference to FIG. 1) by serializing the envelope information to a binary byte stream.

Order and sequence are important for ensuring accurate results. Specifically, the order of sequencing of the file streams must be in the same sequence as indicated in the capsule file 510, which is the same as the sequence of files concatenated by the capsule file generation process 100, described above by reference to FIG. 1. Also, for the capsule envelope metadata stream, any additional information provided in the capsule file 510 by the stream concatenation step 130 or after, in the capsule file generation process 100 of FIG. 1, are excluded from the metadata stream when the capsule file verification process 500 performs stream concatenation (at 580). The rationale is that such data was not available to, and thus not digitally signed by, the central notary system at the point in time at which the original digital signature was taken. In particular, the principle of causality requires exclusion of the blockchain storage location noted in the blockchain 145, and also excludes the time at which blockchain recording was performed, and the final digital signature was obtained from the digital signature of stream (at 135), described above by reference to FIG. 1. Also, the order of data fields presented in the capsule metadata stream must be in exactly the same sequence as was applied in the capsule file generation process 100 of FIG. 1. The same encoding algorithm and serialization protocol to convert the file bytes to the stream as applied in during stream concatenation (at 130) of the capsule file generation process 100 of FIG. 1, must be used in the verification.

By way of demonstrating an example of stream concatenation (at 580) as performed by the capsule file verification process 500 shown in FIG. 6, reference is made to the XML-serialization of the capsule file illustrated in FIG. 3, which would be serialized and concatenated into a single byte stream made up of at least three binary streams. In particular, the first binary stream would include binary file contents of the first file after decryption (i.e., the file named "InsuranceClaim.txt" as shown in the XML). The second binary stream would include binary file contents of the second (and in this example, the last) file (i.e., the file named "fire-Dec-2018.jpg" as shown in the XML). These two streams would be followed by a third stream, representing the repeated serialization of the asserted capsule content which may have previously been encoded (e.g., serialization of envelope metadata), being the serialized representation of the user-provided data, namely, Capsule Name being "Insurance Claim" and Capsule Description being "Documents and photographs pertaining to fire damage, December 2018".

After completing stream concatenation (at 580) of all the files in the capsule file 510, the capsule file verification process 500 of some embodiments recomputes the digital signature of the stream content (at 585). In some embodiments, the central notary system 515 takes the single, merged stream as output by stream concatenation (at 580) and signs the single, merged stream using the same NIST-approved digital signing algorithm used in the capsule file generation process 100 to obtain the digital signature of the stream (at 135), as described above by reference to FIG. 1. In this way, the capsule file verification process 500 can produce a signature of a length that corresponds to the signing algorithm. By reference to FIG. 3, for example, the signing algorithm as recorded uses an HMAC SHA2 256 digital signature, so the same algorithm, and the same secret key (which is known only to the central notary system 515), is reapplied to the single, merged stream produced by stream concatenation (at 580). Then the base-64 encoding is applied to the resulting sixteen byte message digest produced by the same algorithm, in order to reproduce the notarized hash— as the digital signature of the stream content (at 585) recomputed by the capsule file verification process 500.

In some embodiments, the capsule file verification process 500 then determines (at 590) whether the recomputed digital signature of the stream content (that is, the reproduced notarized hash) is the same as the asserted signature (i.e., the notarized hash) recorded in the presented capsule file 510. When the recomputed notarized hash is different from the original notarized hash as recorded in the capsule file 510, then the capsule file verification process 500 returns to the failure state 540 and informs the presenting user 505 of the failure. On the other hand, when the comparison yields an exact match between recomputed notarized hash and the notarized hash asserts in the presented capsule file 510 (as confirmed and recorded in the blockchain storage location stated in the presented capsule file 510), then the central notary system 515 shall regard the presented capsule file 510 as authentic and verified. In particular, the presenting user 505 who provided the capsule file 510 for verification to the central notary system 515 will have a certified authentic capsule file 510 and, by being authorized to access the contents of the certified authentic capsule file 510, is granted access (at 595) to the content of the capsule file 510. In some embodiments, the capsule file verification process 500 ends at this point.

However, in some other embodiments, the capsule file verification process 500 continues to allow the presenting user 505 to perform file downloading (at 600) of one or more of the files contained within the certified authentic capsule file 510. For example, the presenting user 505 may download the file(s) onto a computing device presently under operational control of the presenting user 505. In some embodiments, instead of downloading the file(s) to a local computing device, the capsule file verification process 500 treats the file downloading (at 600) as transferring the file(s) to a cloud-based storage unit specified by the presenting user 505.

In another embodiment of the capsule file verification process 500, the central notary system 515 provides the presenting user 505 with a certificate of authenticity of the capsule file 510, which may be used by the presenting user 505 as legal proof of the authenticity of claims made by the capsule file 510, including the files contained with the capsule file 510, and the timestamp reported in the capsule file 510. For example, in a country, a state (e.g., a State of the United States), a province, or another legal jurisdiction which recognizes blockchain technology as admissible proof of ownership and time stamping, and which has approved the processes and systems described in the present disclosure, such certificate may be regarded as a legally binding proof in the context of the domain to which the central notary system is applied.

Many of the descriptions and detailed examples above make reference to XML files that provide a format for serialization of a capsule. Reference is also made to XSD files that define a format of the capsule and resulting serialized capsule as an XML file. By way of example, FIGS. 7-8 conceptually illustrate an XML Schema Definition (XSD) file by which by XML serialization can be employed to generate a capsule file in some embodiments. The XSD file shown in this figure provides an example definition of a serializable notarized capsule.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
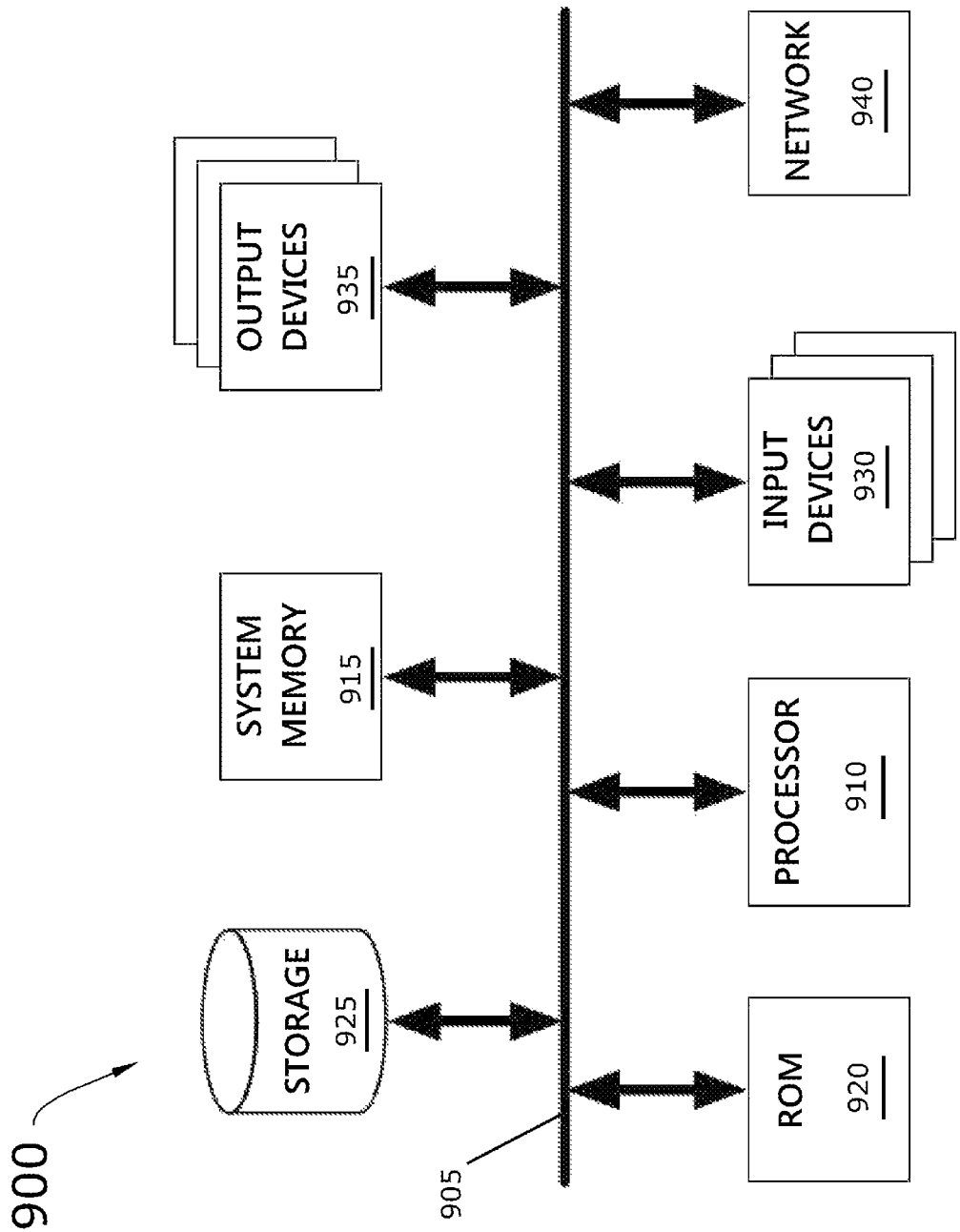
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, phone, PDA, or any other sort of electronic device. Such an electronic system includes various types of computer readable media with various types of interfaces. Electronic system 900 includes a bus 905, processing unit(s) 910, a system memory 915, a read-only-memory 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only-memory 920, the system memory 915, and the permanent storage device 925.

From these various memory units, the processing unit(s) 910 retrieves instructions and data to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random-access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing or cursor control devices. The output devices 935 display images and alphanumeric information and data input by a user and generated for visual output by the electronic system 900. The output devices 935 include printers and display devices, such as cathode ray tubes (CRT), liquid crystal displays (LCD), or organic light emitting diode (OLED) displays. Some embodiments include a touch-sensitive display (such as a "touchscreen") that functions as both an input and output device.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. Specific descriptions and examples herein are not limited to only those descriptions and/or illustrations, but are provided as reference to the underlying functions and features of the invention. For instance, FIGS. 1, 4, and 5-6 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A capsule file generation method for centralized user file encapsulation, encryption, notarization, and verification using a blockchain, said capsule file generation method comprising:

selecting, by an owner user, and uploading, to a centralized and trusted notary system ("centralized notary system"), user file and data content ("uploaded user data") comprising at least one of non-file formatted data and one or more files;

authenticating identity of the owner user by the centralized notary system;

applying a contemporary, National Institute of Standards and Technology (NIST)-approved cryptographic digital signature to the uploaded user data;

storing the cryptographic digital signature onto a blockchain record; and generating a capsule file as a single file comprising the cryptographic digital signature, a storage location identifier reported by the blockchain that identifies a storage location of the blockchain record, and an encrypted representation of the uploaded user data.

2. The capsule file generation method of claim 1 further comprising recording a timestamp of storing the cryptographic digital signature onto the blockchain record, wherein generating the capsule file comprises adding the timestamp to the capsule file.

3. The capsule file generation method of claim 1, wherein the generated capsule file is made available to the owner user after generation.

4. The capsule file generation method of claim 3, wherein the owner user can store the generated capsule file on at least one of a local storage unit and a cloud storage unit of the owner user's choosing.

5. A capsule file access granting method for sharing access to an existing capsule file, said capsule file access granting method comprising:

selecting, by a capsule owner, an existing capsule file to which to share access, wherein the existing capsule file is an encrypted capsule file that encapsulates content comprising capsule eXtensible Markup Language (XML) data, embedded file content, metadata information, a data reference to a blockchain storage location of a notarized hash, a notarized capsule hash, and a digital signature;

identifying, by the capsule owner, a target user with whom to share access to the existing encrypted capsule file;

selecting and setting access rights, by the capsule owner, for the target user to present the existing encrypted capsule file for verification and access the encapsulated content of the encrypted capsule file; and notifying the target user of the access rights set by the capsule owner permitting the target user to present the existing encrypted capsule file for verification and access the encapsulated content of the encrypted capsule file.

6. The capsule file access granting method of claim 5 further comprising recording access rights to the existing encrypted capsule file, by a central notary system in response to the selected access rights from the capsule owner, in a central access control database.

7. A capsule file verification method comprising:
presenting a capsule file for verification to a central notary system by a presenting user in possession of the capsule file;
storing, by the central notary system, the capsule file in a temporary storage;
determining whether a format of the capsule file is valid;
reading a capsule envelope when the format of the capsule file is valid;
loading capsule file access rights from a central access control database by the central notary system;
determining whether the presenting user is authorized to read the capsule file based on the capsule file access rights;
reading a notarized hash at a blockchain location indicated in the capsule envelope;
comparing the notarized hash at the blockchain location to a notarized capsule hash of the capsule file;
determining whether the notarized hash and the notarized capsule hash match based on the comparison;
decrypting contents of the capsule file when the notarized hash and the notarized capsule hash match;
determining whether decryption of the contents of the capsule file succeeds;
creating a merged stream, when decryption of the contents of the capsule file succeeds, by concatenating serialized byte streams of the decrypted contents of the capsule file;
recomputing a digital signature of the merged stream content;
comparing the recomputed digital signature to a digital signature asserted in the capsule file;
determining whether the recomputed digital signature and the asserted digital signature match;
granting the presenting user access to the contents of the capsule file when the recomputed digital signature and the asserted digital signature match; and
ending processing at a failure state when any one of (i) the recomputed digital signature and the asserted digital signature do not match, (ii) decryption of the contents of the capsule file does not succeed, (iii) the notarized hash and the notarized capsule hash do not match, (iv) the presenting user is not authorized to read the capsule file based on the capsule file access rights, and (v) the format of the capsule file is not valid.

8. The capsule file verification method of claim 7 further comprising authenticating identity of the presenting user in possession of the capsule file presented to the central notary system for verification and certification.

9. The capsule file verification method of claim 7, wherein creating the merged stream further comprises concatenating a serialized byte stream of decrypted envelope metadata indicated in the capsule file.

10. The capsule file verification method of claim 7, wherein determining whether the format of the capsule file is valid comprises comparing an eXtensible Markup Language (XML) file that describes a serialized instance of the presented capsule file to an XML schema definition (XSD) file that defines a format for capsule serialization in XML.

* * * * *